(12) United States Patent
Chang

(10) Patent No.: US 11,965,984 B2
(45) Date of Patent: Apr. 23, 2024

(54) NIGHT VISION DEVICE WITH DISTANCE MEASUREMENT FUNCTION AND IMPLEMENTATION THEREOF

(71) Applicant: New Pocket Device Corp., New Taipei (TW)

(72) Inventor: Pei Hsiang Chang, New Taipei (TW)

(73) Assignee: NEW POCKET DEVICE CORP., New Taipei (TW)

( * ) Notice: Subject to any disclaimer, the term of this patent is extended or adjusted under 35 U.S.C. 154(b) by 319 days.

(21) Appl. No.: 17/477,636

(22) Filed: Sep. 17, 2021

(65) Prior Publication Data

US 2023/0087556 A1   Mar. 23, 2023

(51) Int. Cl.
*G01S 7/484*        (2006.01)
*G01S 7/481*        (2006.01)
*G01S 17/08*        (2006.01)

(52) U.S. Cl.
CPC ............. *G01S 7/484* (2013.01); *G01S 7/4811* (2013.01); *G01S 17/08* (2013.01)

(58) Field of Classification Search
CPC ........ G01S 7/484; G01S 7/4811; G01S 17/08; G01C 3/08; H04N 23/56; H04N 23/21
USPC .......................................... 356/630
See application file for complete search history.

(56) References Cited

U.S. PATENT DOCUMENTS

2018/0224545 A1*   8/2018   Price .................. G06F 3/011
2018/0332204 A1*  11/2018   Chien ................. H04N 7/186

* cited by examiner

*Primary Examiner* — Md M Rahman
(74) *Attorney, Agent, or Firm* — BACON & THOMAS, PLLC

(57) ABSTRACT

A night vision device with distance measurement function is configured to obtain a distance between a target object and the night vision device with distance measurement function by inputting a size of the target object and by using a focal length of an objective lens unit, a pixel information of an image sensing module, and a resolution of a display unit. In this way, a simple, fast and inexpensive distance measurement can be achieved without the conventional laser rangefinder.

10 Claims, 12 Drawing Sheets

NIGHT VISION DEVICE WITH DISTANCE MEASUREMENT FUNCTION AND IMPLEMENTATION THEREOF

BACKGROUND OF INVENTION

(1) Field of the Present Disclosure

The present disclosure relates to a night vision device, and more particularly to a night vision device with a distance measurement function.

(2) Brief Description of Related Art

There are many types of night vision devices on the market. Among them, the night vision device with active infrared light is the most common one. It has the advantage of not being restricted by the illuminance and the advantage of the low price. However, the general night vision device has only the function of observing the target object and not the function of measuring the distance of the target object. When it is necessary to measure the distance of the target object, the general night vision device needs to be used together with the laser rangefinder to achieve the ability of the night vision device to measure the distance. Although the distance measurement accuracy of the laser rangefinder is high, the cost is relatively high. Accordingly, how can the night vision device still achieve effective distance calculation without increasing the cost is a problem to be solved.

SUMMARY OF INVENTION

It is a primary object of the present disclosure to provide a night vision device with distance measurement function that can use software to measure the distance of a target object without additional hardware devices.

According to the present disclosure, a night vision device with distance measurement function includes a housing, an objective lens unit, an infrared light unit, an operating unit, a display unit, a night vision and distance measurement system, and a power module. In one embodiment, the infrared light unit is used to emit an infrared light. The infrared light reflected by a target object is received by the objective lens unit, and transmitted to the night vision and distance measurement system for calculation and display on the display unit. When estimating the distance of the target object, the operating unit inputs a size of the target object. With the night vision and distance system, an auxiliary mark is displayed based on a preset distance and the parameters of each optical element. The auxiliary mark defines the corresponding size pattern of the target object under the condition of the size of the target object and the preset distance. By correcting the preset distance, the auxiliary mark in the display unit has the same size pattern as the target object. At this time, the corrected preset distance is the estimated distance between the target object and the night vision device with distance measurement function. In this way, the night vision device can still achieve an effective estimation of the distance without increasing the cost.

DETAILED DESCRIPTION OF PREFERRED EMBODIMENTS

Figure 1:
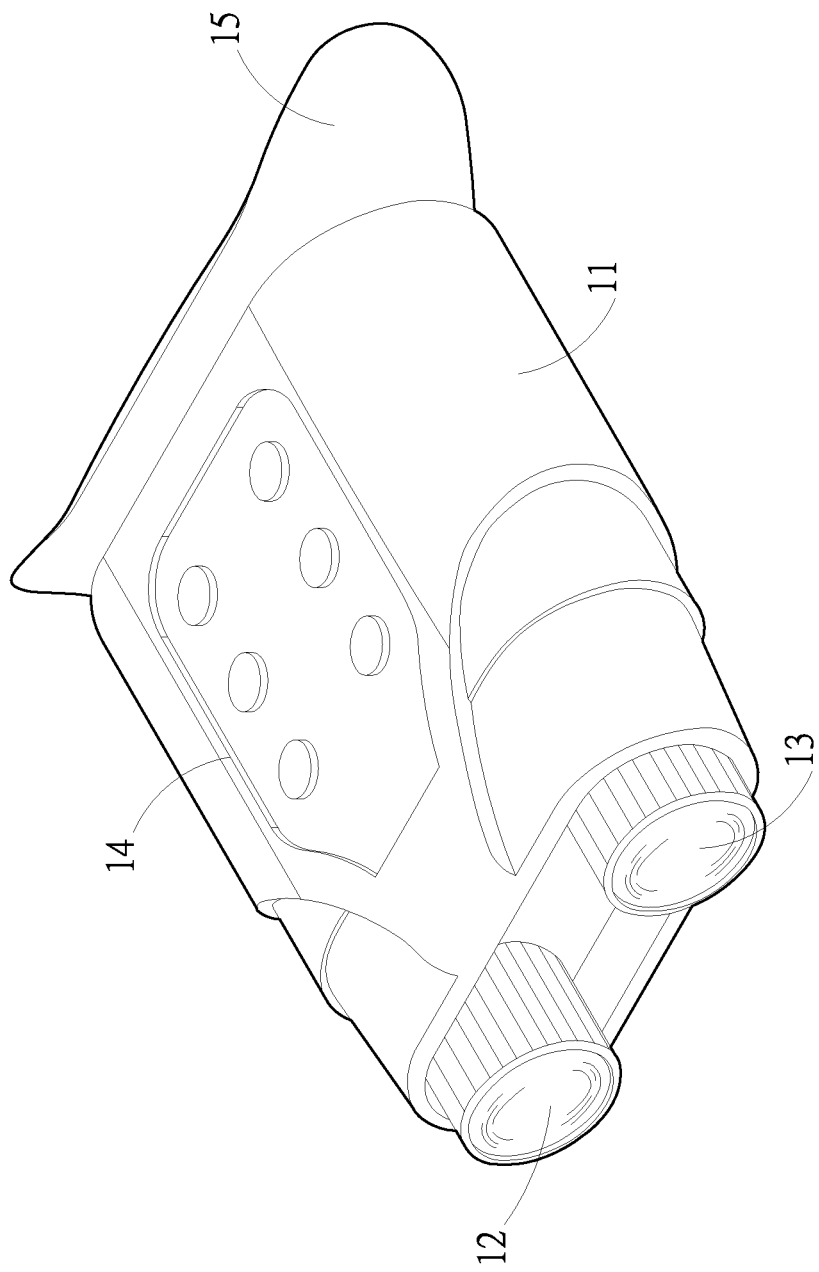
FIG. 1 is a perspective view of a night vision device in accordance with the present disclosure.
Figure 2:
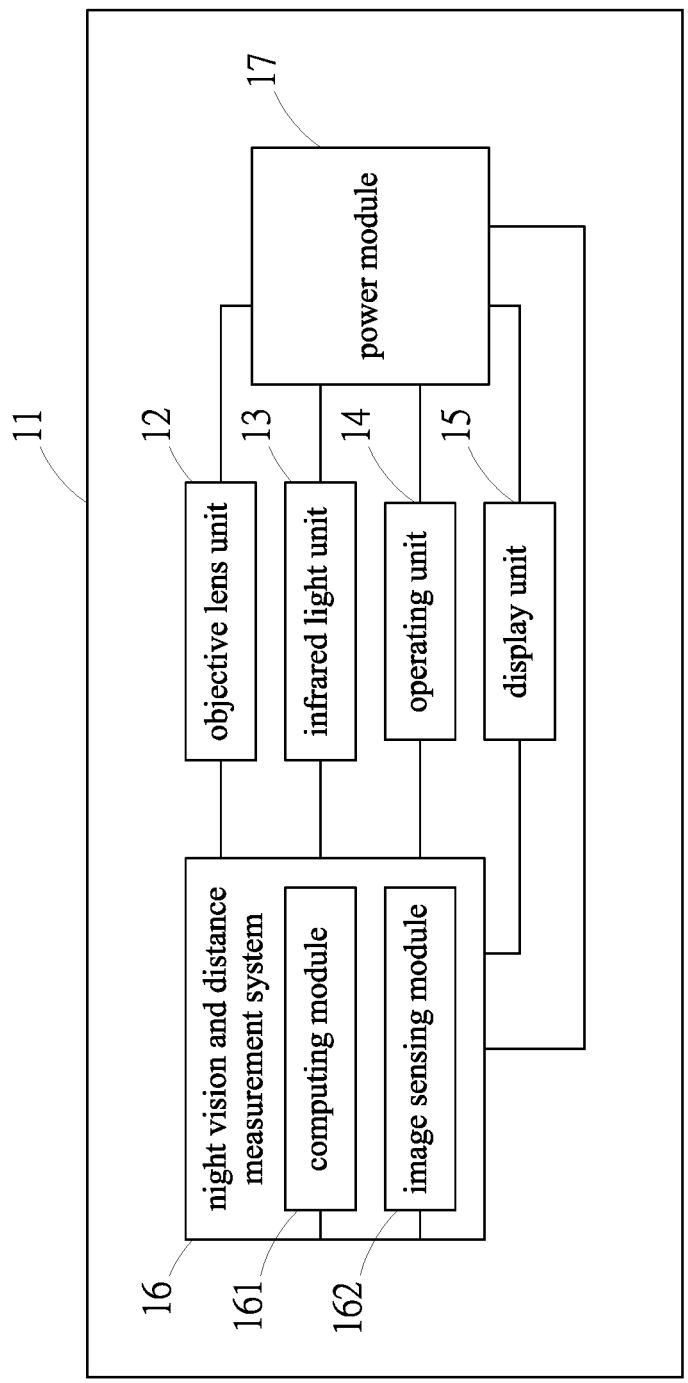
FIG. 2 is a block diagram of a first embodiment of the night vision device according to the present disclosure.

Referring to FIG. 1 and FIG. 2, a night vision device 1 with distance measurement function in accordance with the present disclosure includes a housing 11, an objective lens unit 12, an infrared light unit 13, an operating unit 14, a display unit 15, a night vision and distance measurement system 16, and a power module 17. The above-mentioned elements are described as follows:

The objective lens unit 12 and the infrared light unit 13 are positioned at one end of the housing 11. The display unit 15 is disposed at the opposite end of the housing 11. The housing 11 is provided to facilitate the user to hold and operate. Moreover, the housing 11 can effectively protect the night vision and distance measurement system 16 and the power module 17 to reduce the influence of environmental temperature difference, humidity, and air pressure changes. Meanwhile, the housing 11 can enable the night vision device 1 with distance measurement function to achieve good waterproof and dustproof performance.

The objective lens unit 12 is positioned at one end of the housing 11, and establishes an information link with the night vision and distance measurement system 16 and an electric connection with the power module 17. The night vision device 1 with distance measurement function can receive the reflected infrared light through the objective lens unit 12. A digital image is displayed on the display unit 15 after the operation of the night vision and distance measurement system 16.

The infrared light unit 13 and the objective lens unit 12 are positioned at one end of the housing 11 and establishes an information link with the night vision and distance measurement system 16 and an electric connection with the power module 17. The infrared light unit 13 can emit an infrared light which is reflected after being irradiated to external objects. Meanwhile, the infrared light is received by the objective lens unit 12 to achieve the night vision. The infrared light unit 13 may be, for example, a light emitting module in which an infrared light emitting diode (IR LED) is packaged in a condenser lens. The wavelength of the infrared light emitted by the infrared light unit 13 ranges from 850 nm to 940 nm.

The operating unit 14 is disposed on the housing 11 and establishes an information link with the night vision and distance measurement system 16 and an electric connection with the power module 17. The operating unit 14 can turn the night vision device 1 with distance measurement function on or off and adjust the magnification, brightness, focal length, etc. of the night vision device 1 with distance measurement function. Meanwhile, the operating unit 14 can input and set a size data and a preset distance to the night vision and distance measurement system 16. Moreover, the preset distance is modified to obtain an estimated distance. The operating unit 14 may be implemented by technical means such as physical keys, touch operation, voice control, Internet of Things (JOT), etc., but is not limited thereto.

The display unit 15 is positioned at the other end of the housing 11 and establishes an information link with the night vision and distance measurement system 16 and an electric connection with the power module 17. After operation by the night vision and distance measurement system 16, the display unit 15 can display the digital image, the size data of the target object, the preset distance between the target object and the night vision device 1 with distance measurement function, and the estimated distance between the target object and the night vision device 1 with distance measurement function. The display unit 15 may be one of LCD, TFT-LCD, OLED, or LED. Preferably, the display unit 15 displays an auxiliary mark 151. The auxiliary mark 151 is used to display the interval marked by the size data, which will change with the estimated distance. Generally speaking, under the same size data, when the estimated distance is larger, the displayed auxiliary mark 151 will be smaller. The auxiliary mark 151 can be one or a combination of cursor, arrow, and the shape of the selected target object. However, it should not be limited thereto.

The night vision and distance measurement system 16 is positioned within the housing 11 and establishes an electric connection with the power module 17. The night vision and distance measurement system 16 includes a computing module 161 and an image sensing module 162. The computing module 161 establishes an information link with the image sensing module 162. The computing module 161 is used to run the night vision device 1 with distance measurement function and control the execution of the above-mentioned modules, such as: displaying a digital image on the image sensing module 162 based on the received infrared light, and sending it to the display unit 15; displaying the auxiliary mark 151; and computing the result of the estimated distance, etc. The computing module 161 has functions such as logic operations, temporarily storing the results of operations, and saving the position of execution instructions. It may be, for example, a CPU. Moreover, the computing module 161 may further include a graphics processing unit (GPU) for performing more detailed post-processing on the digital image, such as removing thermal noise, enhancing the contours of objects in the digital image, etc. The image sensing module 162 is used to generate a digital image based on the infrared light received by the objective lens unit 12. Meanwhile, a component characteristic data is stored such that the component characteristic data can be used as input data to calculate the estimated distance by the computing module 161.

The power module 17 is positioned within the housing 11 and electrically connected with the above-mentioned components. The power module 17 is used to provide the power required by the night vision device 1 with distance measurement function and each component. The power module 17 can transmit electric energy to each module through the night vision and distance measurement system 16. Also, it can be directly electrically connected to the modules for direct power supply. The power module 17 can be directly built in the housing 11. It can also be a replaceable battery, but it is not limited thereto.

As shown in FIG. 1 and FIG. 2, the component characteristic data stored in the image sensing module 162 may include a focal length of the objective lens unit 12, a unit pixel size and a total length of the image sensing module 162, a resolution of the display unit 15, etc. The night vision device 1 with distance measurement function can use the objective lens unit 12 to capture the infrared light reflected by the target object, thereby forming a digital image on the image sensing module 162. The target object size presented on the image sensing module 162 is related to the focal length of the objective lens unit 12 and the unit pixel size of the image sensing module 162. Similarly, when the data in the image sensing module 162 is transmitted to the display unit 15 for display, the resolution of the image sensing module 162 and the resolution of the display unit 15 are positively correlated with each other. The computing module 161 uses the component characteristic data as input data to estimate the distance. Taking the vertical direction as an example, the computing rules are as follows:

First, it is assumed that the focal length of the objective lens unit 12 is f, the size of each unit pixel of the image sensing module 162 is p, the total vertical height pixel is V_total, the vertical resolution of the display unit 15 is T_total, the actual height of the observed target object is 0_Height, and the distance between the observed target object and the night vision device 1 with distance measurement function is R.

At this time, it is known that the distance resolution of the night vision and distance measurement system 16 is arctan (p/f). In the case of the distance R, the projected size of one pixel unit of the image sensing module 162 can be calculated to be R*arctan (p/f). Also, because the size of the target object is O_Height, the target object at the position of the distance R will occupy the image sensing module 162 with O_Height/(R*arctan(p/f)) pixels. In this case, the total vertical height pixel V_total of the image sensing module 162 is introduced. The ratio of the vertical total height pixel V_total of the image sensing module 162 to the vertical resolution T_total of the display unit 15 is (T_total/V_total). In this way, it can be deduced that the target object occupies the display unit 15 with O_Height/(R*arctan(p/f))*(T_total/V_total) display points. In addition to the vertical direction for measurement and calculation, the horizontal direction can also be calculated in the same way so that no further description thereto is given hereinafter.

Accordingly, a detailed description will be given with an embodiment as follows.

The focal length of the objective lens unit 12 is 35 mm, the size of each unit pixel of the image sensing module 162 is 3 um, the total vertical height of the image sensing module 162 is 1080 pixels, and the vertical resolution of the display unit 15 is 360. At this time, it is known that the resolution of the night vision and distance measurement system 16 is arctan(3 um/35 mm)=$8.5714 \times 10^{-5}$ rad.

In the case of the distance over 100 m, the actual length corresponding to each pixel unit is 100 m*$8.571 \times 10^{-5}$=0.00857 m.

Assuming that the height of the observed target object is 1.8 m, it can be estimated that the target object at a distance over 100 m will occupy the image sensing module 162 by 1.8 m/0.00857 m=210 pixels.

Because the ratio of the resolution of the image sensing module 162 to the resolution of a display screen is 1080/

360=3, it can be calculated that a person at the distance over 100 m will occupy 210/3=70 points of the display unit 15.

By correcting the distance between the observed target object and the night vision device 1 with distance measurement function, the display point occupied by the display unit 15 can be made close to the target object displayed by the display unit 15, thereby measuring the distance. In this way, the effect of distance measurement is achieved.

Figure 3:
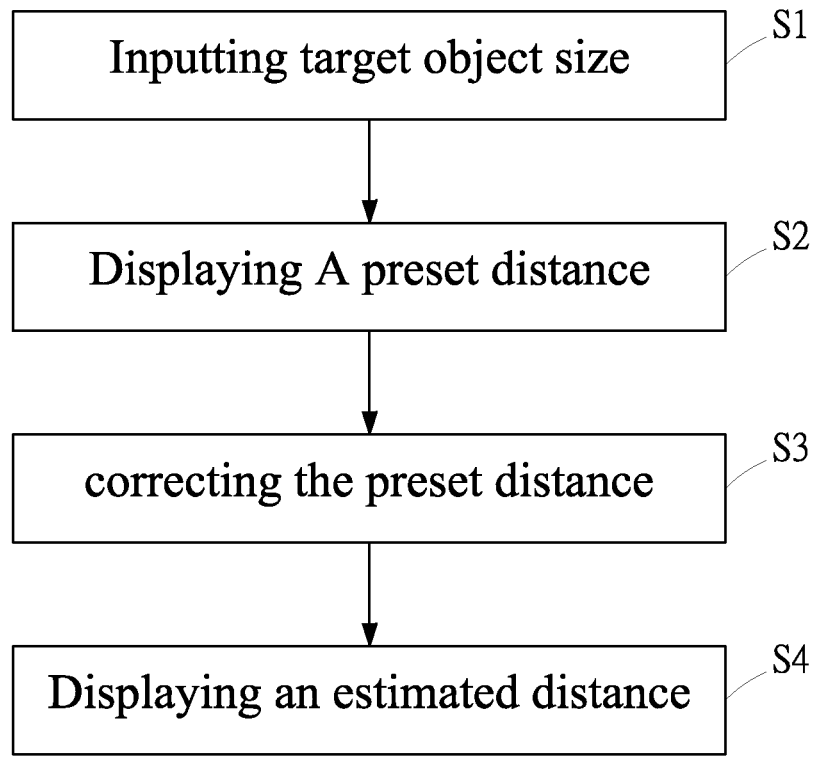
FIG. 3 is a flow chart of a method according to the present disclosure.
Figure 4:
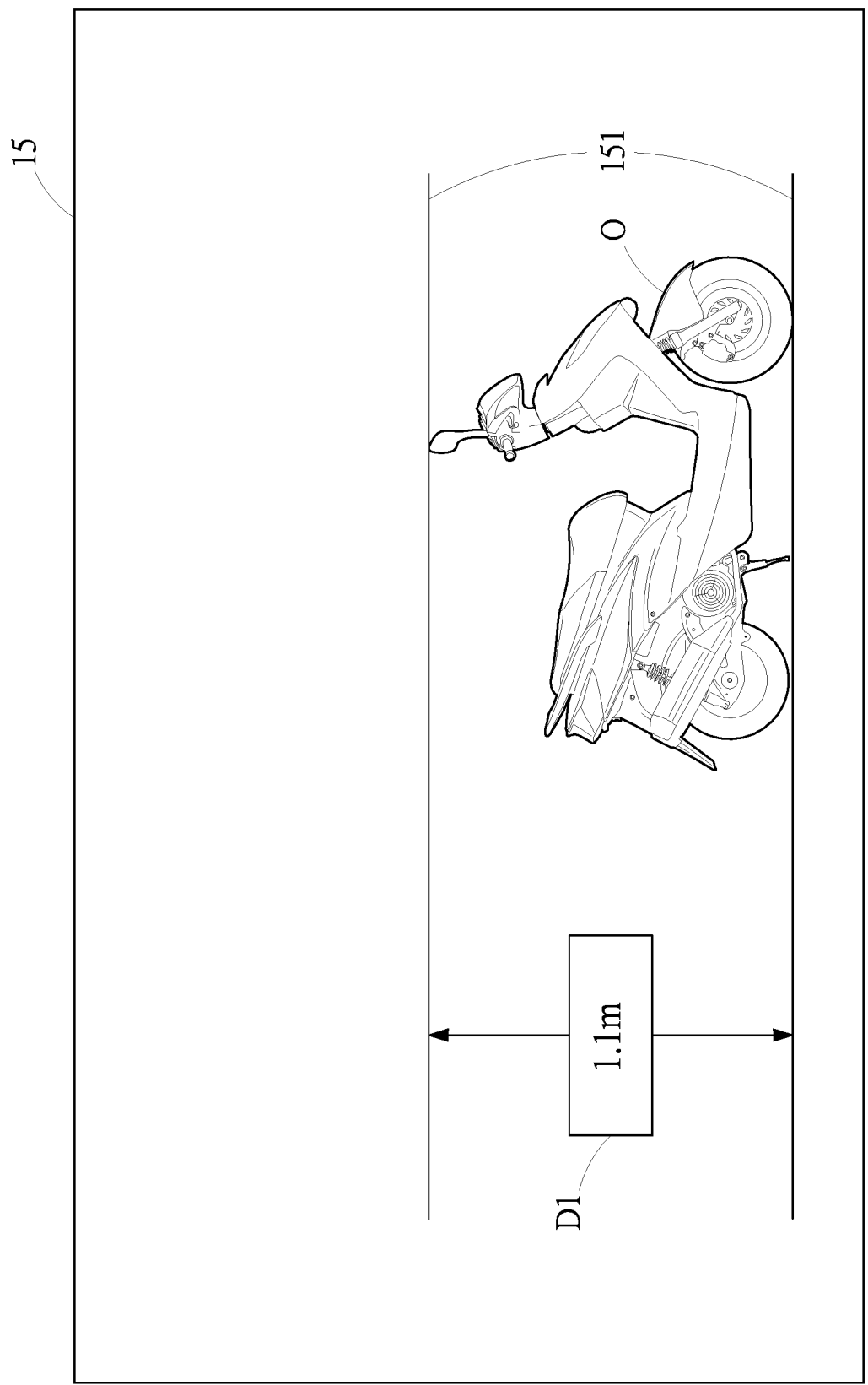
FIG. 4 is a schematic drawing I of the implementation of the present disclosure.

Referring to FIG. 3, a target object O to be distance-measured is selected first prior to the use of the night vision device 1 with distance measurement function. Thereafter, a method for measuring the distance by use of the night vision device with distance measurement function is executed. The method includes the following steps:

Step S1 of inputting a target object size, wherein a size data D1 of the target object O is inputted through the operating unit 14, transmitted to the night vision and distance measurement system 16. A computing operation is done by the night vision and distance measurement system 16 while the result is shown on the display unit 15. Optionally, an auxiliary mark 151 is displayed on the display unit 15 to assist in displaying the currently inputted size data D1. The size data D1 can be selected from one or a combination of the height size and the width size of the target object O. Referring to FIG. 4, when the night vision device 1 with distance measurement function is used to measure the distance of a target object O (motorcycle), the size data D1 (1.1 m) of the motorcycle can be inputted through the operating unit 14. The auxiliary mark 151 of the display unit 15 indicates that the currently inputted size data D1 is the height of the target object O (motorcycle).

Figure 5:
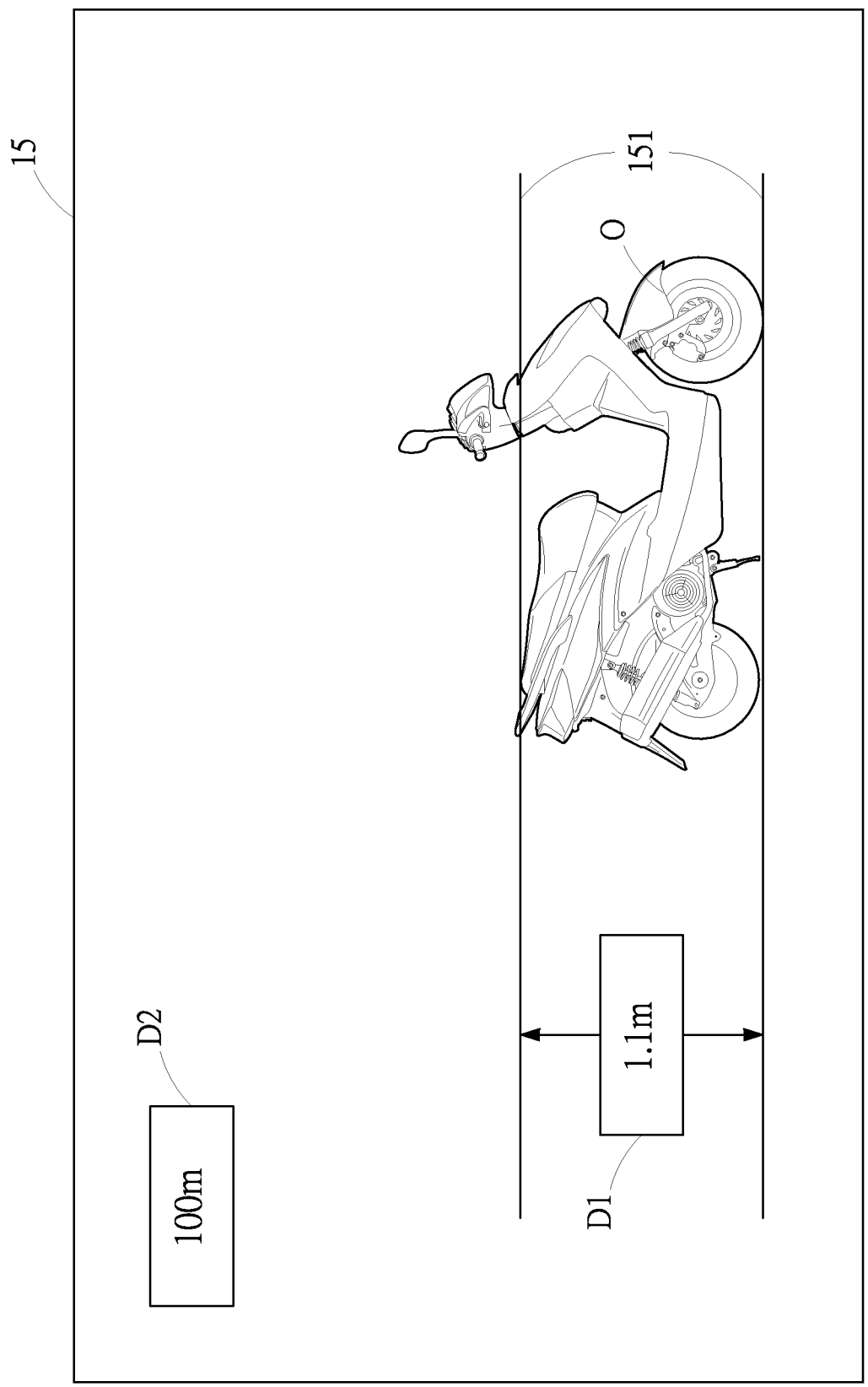
FIG. 5 is a schematic drawing II of the implementation of the present disclosure.
Figure 6:
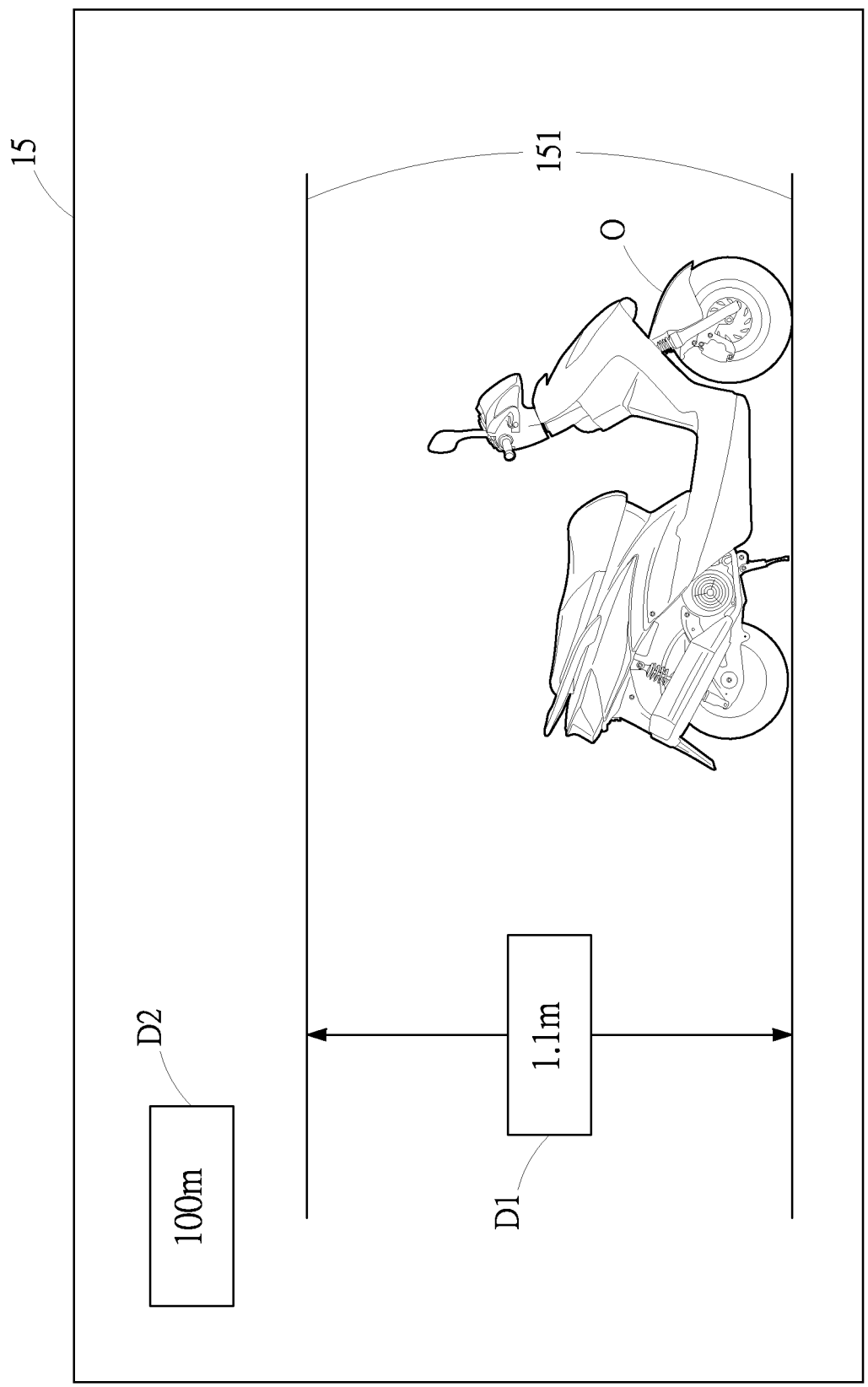
FIG. 6 is a schematic drawing III of the implementation of the present disclosure.

Step S2 of displaying a preset distance, wherein, based on the size data D1 and a preset distance D2, the night vision and distance measurement system 16 causes the auxiliary mark 151 to show the size pattern corresponding to the size data D1 and the preset distance D2. As shown in FIG. 5 and FIG. 6, the night vision and distance measurement system 16 causes the auxiliary mark 151 to show the correct size pattern on the display unit 15 according to the size data of 1.1 meters and the preset distance of 100 meters. FIG. 5 shows that when the actual distance of the target object O (motorcycle) is less than the estimated preset distance D2, the auxiliary mark 151 at this time appears to be smaller in size than the target object O. FIG. 6 shows that when the actual distance of the target object O (motorcycle) is larger than the estimated preset distance D2, the auxiliary mark 151 at this time appears to be greater in size than the target object O.

Figure 7:
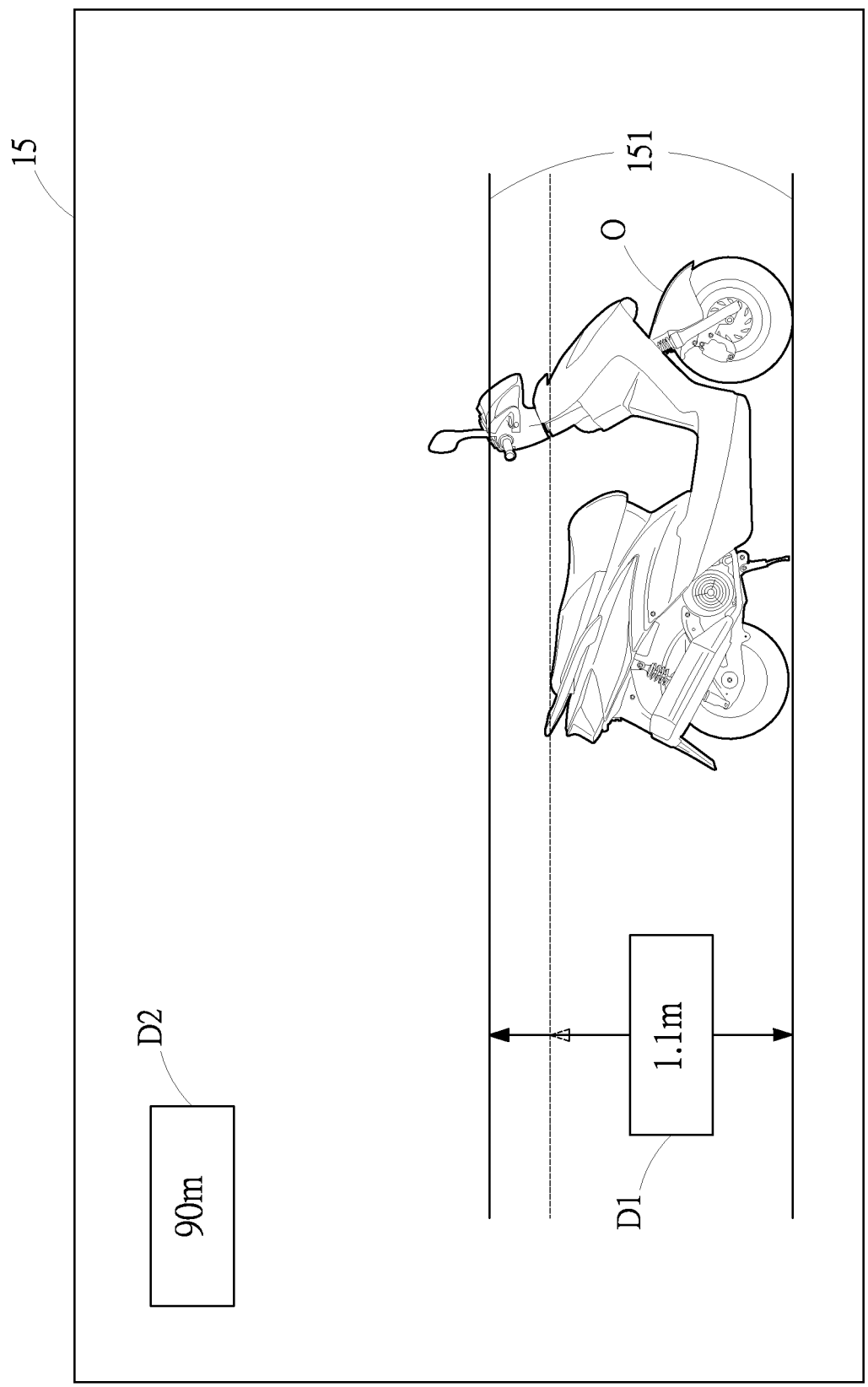
FIG. 7 is a schematic drawing IV of the implementation of the present disclosure.
Figure 8:
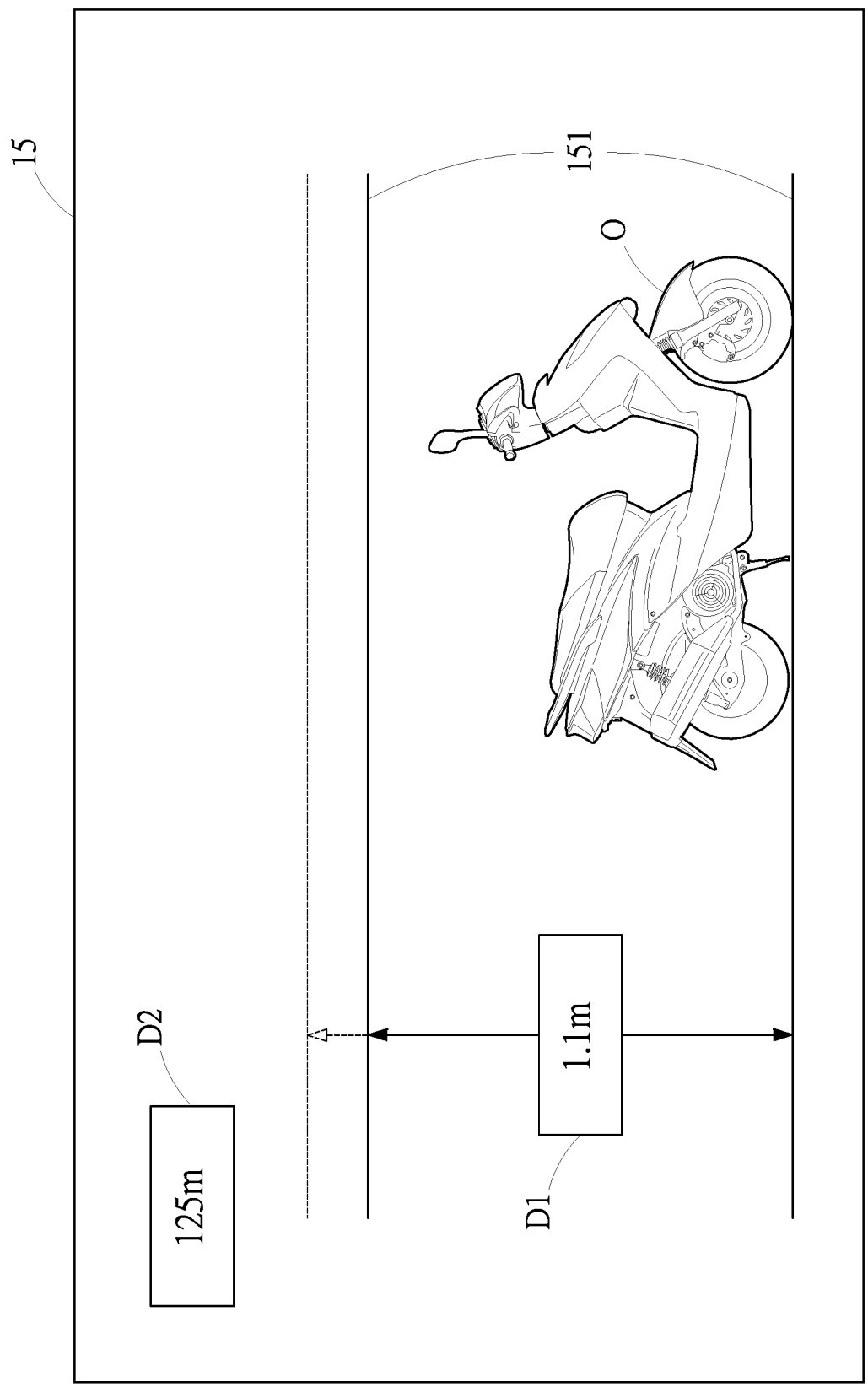
FIG. 8 is a schematic drawing V of the implementation of the present disclosure.

Step S3 of correcting the preset distance, wherein, the preset distance D2 is corrected through the operating unit 14. The size pattern shown by the auxiliary mark (151) is adjusted based on the size data D1 and the corrected preset distance D2. As shown in FIG. 7 and FIG. 8, the preset distance D2 is corrected through the operating unit 14. The auxiliary mark 151 in the display unit 15 is adjusted accordingly. FIG. 7 shows that when the actual distance of the target object O (motorcycle) is less than the estimated preset distance D2, the size of the auxiliary mark 151 gradually increases and gradually approaches to the size of the target object O (motorcycle) by reducing the preset distance D2. FIG. 8 shows that when the actual distance of the target object O (motorcycle) is larger than the estimated preset distance D2, the size of the auxiliary mark 151 gradually decreases and gradually approaches to the size of the target object O (motorcycle) by increasing the preset distance D2.

Figure 9:
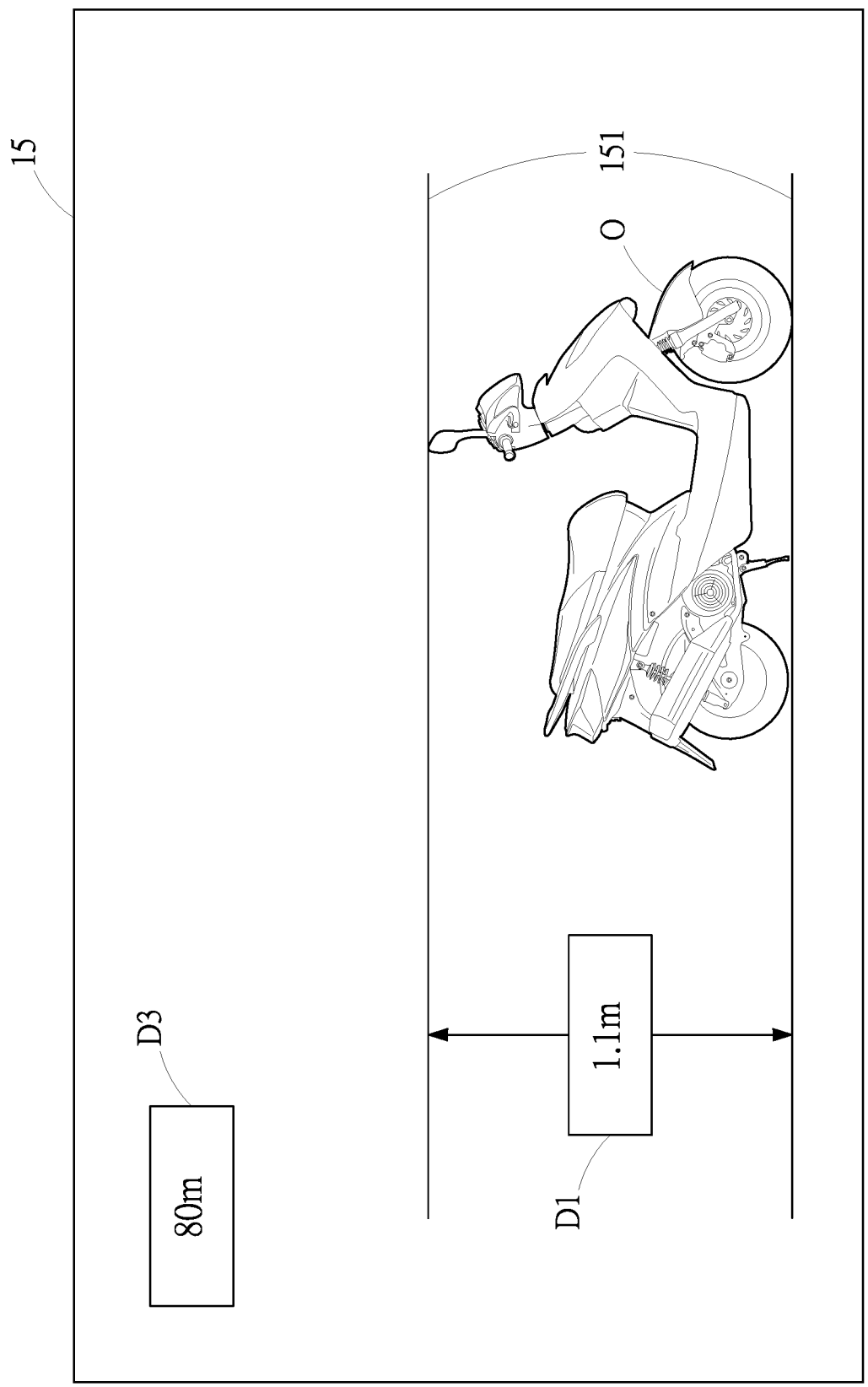
FIG. 9 is a schematic drawing VI of the implementation of the present disclosure.
Figure 10:
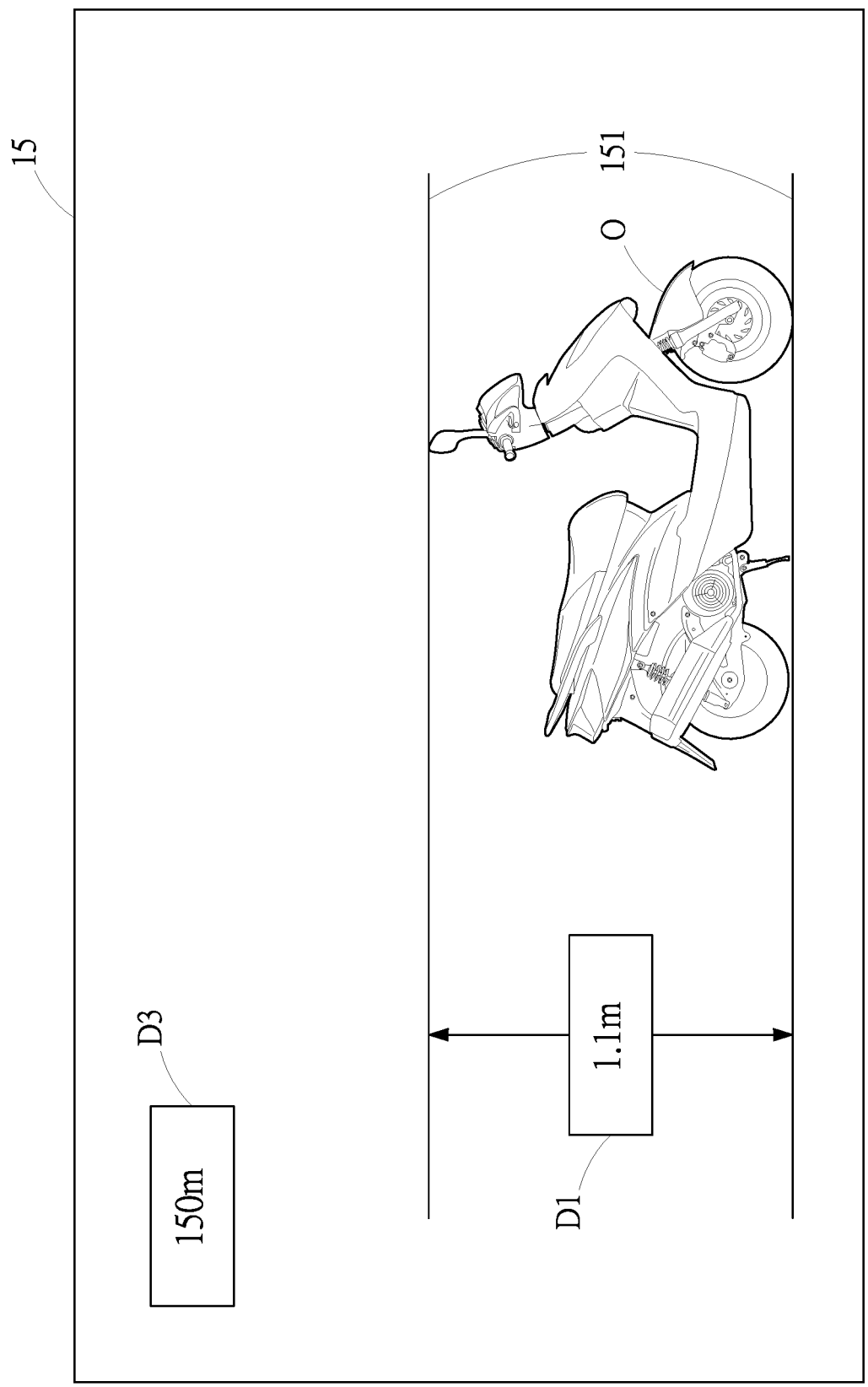
FIG. 10 is a schematic drawing VII of the implementation of the present disclosure.

Step S4 of displaying an estimated distance, wherein, when the auxiliary mark 151 and the target object O have the same size, the corrected preset distance D2 at this time is an estimated distance D3 between the night vision device 1 with distance measurement function and the target object O. The same size pattern means the same height, width, and length. As shown in FIG. 9 and FIG. 10, when the auxiliary mark 151 has the same size as the target object O (motorcycle), or when the height of the cursor is equal to the height of the motorcycle, the corrected preset distance D2 at this time is an estimated distance D3 between the night vision device 1 with distance measurement function and the target object O. As shown in FIG. 9 together with FIG. 5 and FIG. 7, when the preset distance D2 is 100 m and larger than the actual distance, the estimated distance D3 is adjusted to 80 m after calculation. As shown in FIG. 10 together with FIG. 6 and FIG. 8, when the preset distance D2 is 100 m and less than the actual distance, the estimated distance D3 is adjusted to 150 m after calculation.

Figure 11:
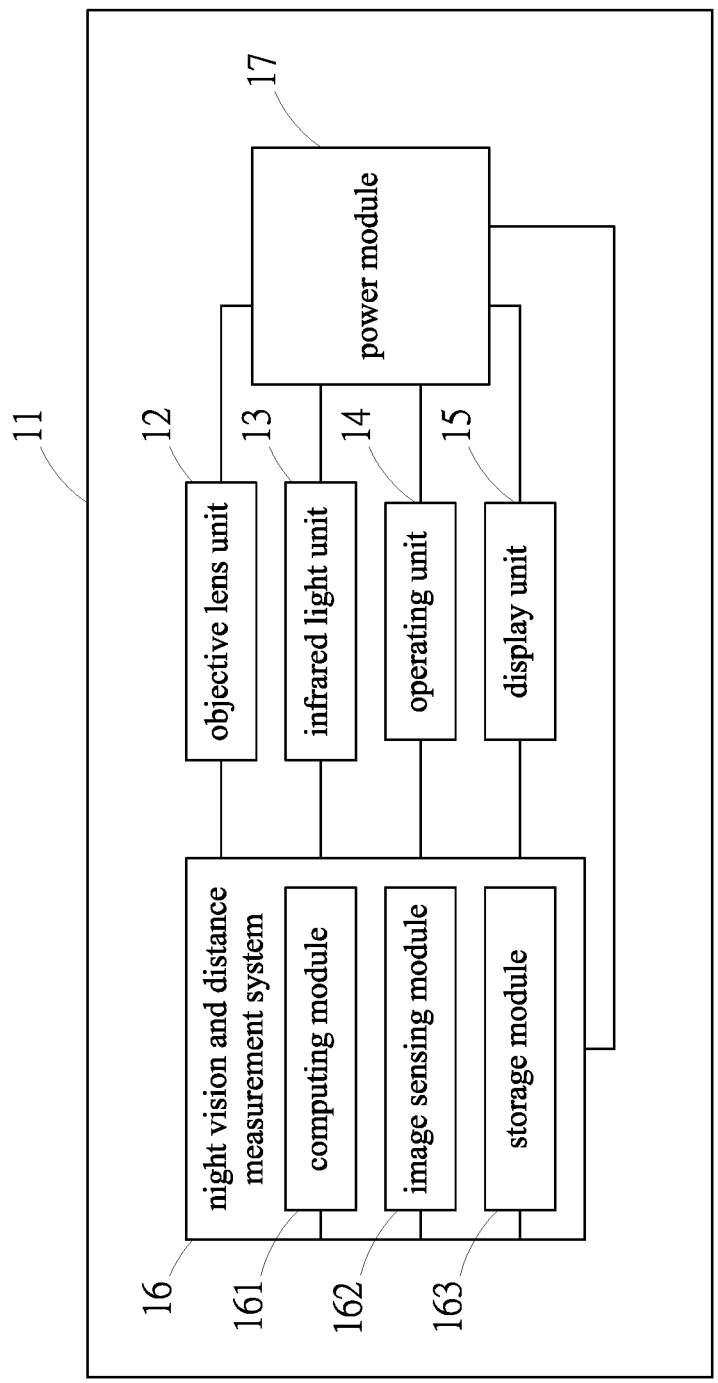
FIG. 11 is a block diagram of a second embodiment of the night vision device according to the present disclosure.

As shown in FIG. 11, the night vision device 1 with distance measurement function in accordance with the present disclosure further includes a storage module 163 which is built in the night vision and distance measurement system 16 and establishes an information link with the computing module 161 and the image sensing module 162. The storage module stores the names of various target objects O and their size data D1. In performing the step S1 of inputting target object size, the name of the target object O is inputted through the operating unit 14. The night vision and distance measurement system 16 retrieves the corresponding size data D1 as a reference for inputting the size data D1 or for an automatic input. In this way, the time of inputting the size data D1 can be reduced. Meanwhile, the problem can be avoided that the deviation of the size data D1 is too large, which leads to the distortion of the estimated distance D3. Optionally, the size data D1 includes a weighting parameter. When the name of the target object O is inputted and the size data D1 is retrieved, the size data D1 can be corrected through the operating unit 14. For example, when a person or an animal is in a different posture, different size data D1 will be presented. More accurate size data D1 will be obtained through correction by use of the weighting parameter.

Figure 12:
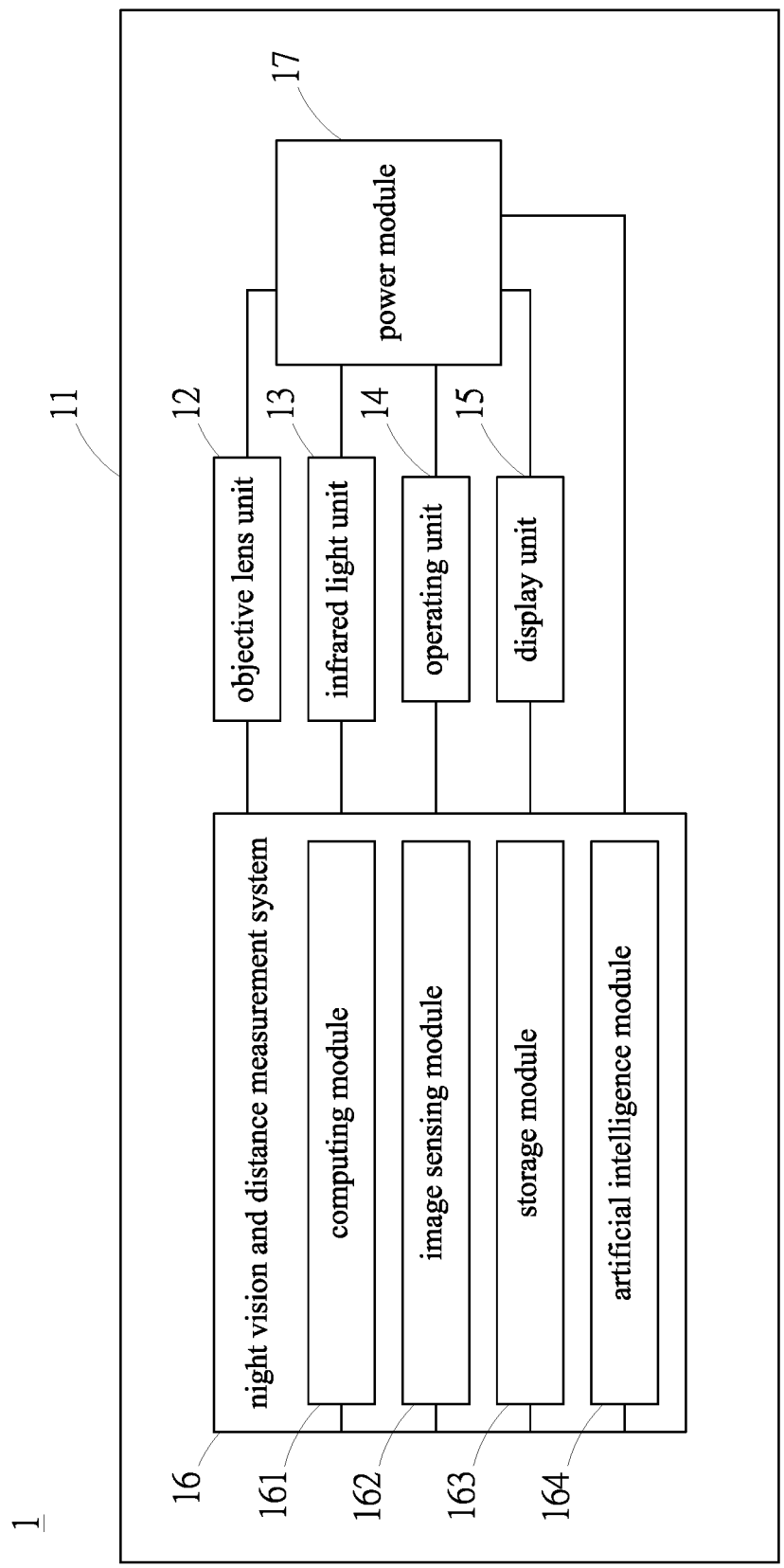
FIG. 12 is a block diagram of a third embodiment of the night vision device according to the present disclosure.

As shown in FIG. 12, the night vision device 1 with distance measurement function in accordance with the present disclosure further includes a storage module 163 and an artificial intelligence module 164 both of which are built in the night vision and distance measurement system 16 and establish an information link with the computing module 161. The storage module 163 stores an image recognition model, various target objects O and corresponding size data D1. The artificial intelligence module 164 is used for image recognition of the target object O based on the image recognition model, determines the target object O, and further obtains its size data D1. Optionally, the size data D1 includes a weighting parameter. When the artificial intelligence module 164 determines the target object O and further obtains its size data D1, the size data D1 can be corrected through the operating unit 14. For example, when a person or an animal is in different postures, different size data D1 will be presented, and more accurate size data D1 will be obtained through correction by use of the weighting parameter. Preferably, the artificial intelligence module 164 further determines the posture of the target object. Meanwhile, an automatic correction is done by use of the weighting parameter, thereby directly obtaining the accurate size data D1.

When the present disclosure is implemented, a preset distance is first assumed. Thereafter, how many display points the target object occupies in the display unit can be calculated by use of the size data of the target object through the relationship between the component characteristic data such as the focal length of the objective lens unit 12, the unit pixel size and the total length of the image sensing module 162, and the resolution of the display unit 15. It will be presented by an auxiliary mark. The preset distance is corrected such that the size of the auxiliary mark in the display unit corresponds to the size of the target object, thereby completing the measurement of the distance between the target object O and the night vision device 1 with distance measurement function. Moreover, the night vision and distance measurement system 16 includes a storage module and an artificial intelligence module. The storage module stores the names of various target objects O, their size data D1, and an image recognition model. In performing the step of inputting target object size, the name of the target object O is inputted through the operating unit 14 so that the corresponding size data D1 can be retrieved. In addition, the artificial intelligence module can also recognize the target object based on the image recognition model and retrieve the corresponding size data. Furthermore, a weighting parameter can be inputted to modify the size data, so that when the target object has a different posture, the size data can be adjusted in time to improve the accuracy of the estimated distance. In this way, it can indeed achieve the purpose of using software to estimate the distance of the target object without additional hardware devices.

REFERENCE SIGN 1 night vision device with distance measurement function
11 housing
12 objective lens unit
13 infrared light unit
14 operating unit
15 display unit
151 auxiliary mark
16 night vision and distance measurement system
161 computing module
162 image sensing module
163 storage module
164 artificial intelligence module
17 power module
D1 size data
D2 preset distance
D3 estimated distance
O target object

What is claimed is:

1. A night vision device with distance measurement function by use of a component characteristic data as an input data to calculate an estimated distance to a target object, comprising:
a housing;
a night vision and distance measurement system disposed within the housing and having computing module circuitry and an image sensing module, the computing module circuitry establishing an information link with the image sensing module, the computing module being used to run the night vision device with distance measurement function, the image sensing module displaying a digital image based on an infrared light, and transmitting the digital image to a display, wherein the image sensing module comprises a first storage configured to store a preset distance;
an objective lens unit disposed at one end of the housing and establishing an information link with the night vision and distance measurement system for receiving the infrared light reflected by the target object and transmitting the infrared light to the night vision and distance measurement system;
an infrared illuminator disposed together with the objective lens unit at one end of the housing and establishing an information link with the night vision and distance measurement system, the infrared illuminator being used to emit the infrared light;
an operating unit disposed on the housing and establishing an information link with the night vision and distance measurement system, the operating unit being used to input and set a size data of the target object and the preset distance as well as to obtain the estimated distance by correcting the preset distance;
the display disposed on the other end of the housing opposite to the objective lens unit and the infrared illuminator, the display establishing an information link with the night vision and distance measurement system for receiving and presenting the digital image, an auxiliary mark, the size data, the preset distance, and the estimated distance; and
a power supply disposed within the housing and electrically connected with the night vision and distance measurement system, the objective lens unit, the infrared illuminator, the operating unit, and the display, the power supply providing the electric energy required by the night vision device with distance measurement function,
wherein the computing module circuitry causes the auxiliary mark to show a size pattern corresponding to the size data and the preset distance.

2. The night vision device as claimed in claim 1, wherein the night vision and distance measurement system comprises a second storage which establishes an information link with the computing circuitry and the image sensing module, and wherein the second storage stores a name of the target object and the corresponding size data, and wherein the name of the target object can be inputted through the operating unit to retrieve the corresponding size data.

3. The night vision device as claimed in claim 2, wherein the size data comprises a weighting parameter with which the size data can be corrected based on a posture of the target object.

4. The night vision device as claimed in claim 2, wherein the night vision and distance measurement system comprises artificial intelligence module circuitry which establishes an information link with the computing module circuitry, the image sensing module, and the second storage, and wherein the second storage stores an image recognition model, and the artificial intelligence module circuitry is used to perform image recognition of the target object based on the image recognition model, and to determine the target object and the size data thereof.

5. The night vision device as claimed in claim 4, wherein the size data includes a weighting parameter for correcting the size data based on the posture of the target object.

6. An implementation method for operating a night vision device with distance measurement function by use of component characteristic data as input data to calculate an estimated distance to a target object, comprising:
inputting a target object size, wherein size data of the target object are inputted through an operating unit and transmitted to a night vision and distance measurement system, and wherein a computing operation is done by the night vision and distance measurement system while the target object and an auxiliary mark are shown on a display;

displaying a preset distance, wherein the night vision and distance measurement system causes the auxiliary mark to show a size pattern corresponding to the size data and the preset distance;

correcting the preset distance, wherein, the preset distance is corrected through the operating unit, the size pattern shown by the auxiliary mark is adjusted by the night vision and distance measurement system based on the size data and the corrected preset distance; and displaying an estimated distance, wherein, when the auxiliary mark and the target object have the same size pattern, the corrected preset distance is the estimated distance.

7. The implementation method as claimed in claim 6, wherein the step of correcting the preset distance includes the process that a name of the target object is inputted through the operating unit, and the night vision and distance measurement system retrieves the corresponding size data.

8. The implementation method as claimed in claim 7, wherein the step of displaying the preset distance includes the process that a weighting parameter is inputted through the operating unit for correcting the size data.

9. The implementation method as claimed in claim 7, wherein the step of displaying the preset distance includes the process that an artificial intelligence module circuitry performs image recognition of the target object based on an image recognition model and determines the target object and the size data thereof.

10. The implementation method as claimed in claim 9, wherein the step of displaying the preset distance includes the process that a weighting parameter is inputted through the operating unit for correcting the size data.

\* \* \* \* \*